United States Patent [19]

Liu

[11] Patent Number: 5,332,064
[45] Date of Patent: Jul. 26, 1994

[54] CONTROL APPARATUS FOR LUBRICATION PUMP

[76] Inventor: Jung-Hsun Liu, No. 12, Lane 74, Tung Hsin Rd., Taichung, Taiwan, Taiwan

[21] Appl. No.: 71,658

[22] Filed: Jun. 3, 1993

[51] Int. Cl.$^5$ ............................................. F01M 1/18
[52] U.S. Cl. ........................................ 184/6.4; 184/31; 184/103.1; 184/108; 417/12
[58] Field of Search ................... 184/6.4, 103.1, 103.2, 184/108, 26, 31; 417/423.3, 311, 428, 440, 12

[56] References Cited

U.S. PATENT DOCUMENTS

| | | | |
|---|---|---|---|
| 3,882,967 | 5/1975 | Gulla et al. | 184/103.1 |
| 5,056,623 | 10/1991 | Glasel et al. | 184/6.1 |
| 5,125,480 | 6/1992 | Gregory et al. | 184/6.1 |
| 5,181,585 | 1/1993 | Braun et al. | 184/6.4 |
| 5,182,720 | 1/1993 | Beck et al. | 184/108 |
| 5,195,612 | 3/1993 | Hahn et al. | 184/6.4 |
| 5,217,662 | 6/1993 | Yamamura et al. | 184/6.1 |
| 5,244,350 | 9/1993 | Yang | 184/108 |

FOREIGN PATENT DOCUMENTS

| | | | |
|---|---|---|---|
| 0419835 | 4/1991 | European Pat. Off. | 417/12 |
| 0215907 | 12/1984 | Japan | 184/26 |
| 0229995 | 9/1990 | Japan | 184/26 |
| 3066999 | 3/1991 | Japan | 184/26 |

*Primary Examiner*—Thomas E. Denion
*Attorney, Agent, or Firm*—Woodcock Washburn Kurtz Mackiewicz & Norris

[57] ABSTRACT

A control apparatus for a lubrication pump to supply lubrication oil to a plurality of working machines includes a tank stored with lubrication oil therein, a cover being covered on the tank having a control panel allowing a user to preset intermittent cycle for oil supplying to external working machines via a pipe, a motor transmittedly engaged to a pump which is installed in the inner space of the tank having a plurality of oil passages allowed to transport the oil from the tank to external working machines. A pressure-adjusted valve is located in the cover exactly at one of the oil passage for adjusting the oil flow rate therethrough. A control circuit installed inside the control panel allows the user to preset the intermittent supplying cycle and indicates insufficient oil situation if the tank is short of oil. At least one detecting device is installed at relatively far end of the pipe for detecting the oil pressure thereof and emitting alarm when the far end pipe has insufficient oil pressure situation.

3 Claims, 7 Drawing Sheets

CONTROL APPARATUS FOR LUBRICATION PUMP

FIELD OF THE INVENTION

The present invention relates to a control apparatus for a lubrication pump, especially one which is allowed to control the oil passage intermittently.

BACKGROUND OF THE INVENTION

Most mechanical machines require at least a minimum of lubrication oil for operating smoothly and effectively. In the past, the supply of the lubrication oil was fulfilled by manual force. However, manual force is ineffective, thus some automatic oil-supplying machines are provided. For example, FIG. 5 illustrates an automatic oil-supplying machine which comprises a tank 60, which is covered with a cover 61. An intermittent control device 62 is installed on the cover 61 for intermittently controlling the oil supplying machine to output oil to an external working machine. The cover 61 also has an oil-inlet 63, an oil-outlet 64, and a motor 65 formed thereon. The motor 65 is engaged to a pump 66 in the tank 60. The pump 66 is further connected to an absorbing tube 67 which responds to the motor 65 and absorbs the oil in the tank 60. The oil absorbed by the absorbing tube 67 is transported to the pump 66, which further transports the oil through a pressure-adjusting valve 68 and forwards it to the oil outlet 64. Any working machine is connected to the oil outlet 64 for receiving oil therefrom. The intermittent control device 62 controls the intermittent time interval for outputting the oil. However, there are some drawbacks in the intermittent control device 62 as following:

Firstly, the accuracy of the control device 62 may be affected by the motor 65 since both of them are installed on the cover 61 thus the rotation of the motor 65 will cause the control device 62 to vibrate. As mentioned, the control device 62 utilizes mechanical structure to control the timing for supplying oil, therefore the unwanted vibration will affect the accurate timing of the control device 62.

Secondly, the pump 66, the pressure-adjusted valve 68, the oil-level switch 69 and the related oil passages are all installed inside the tank 60 and adhered with oil scale after long-term use. Therefore, the parts with oil scale are not easily cleaned.

Thirdly, the parts as mentioned in the tank 60 are apt to vibrate and even collide with each other, thus generating noise whenever the motor 65 is in rotation.

Fourth, to adjust the pressure of the pressure-adjusted valve 68 is cumbersome, since the valve 68 is installed inside the tank 60.

It is the purpose of present invention, therefore, to mitigate and/or obviate the above-mentioned drawbacks in the manner set forth in the detailed description of the preferred embodiment.

SUMMARY OF THE INVENTION

An object of the present invention is to provide a control apparatus for a lubrication pump to supply lubrication oil to a plurality of working machines includes a tank stored with lubrication oil therein, a cover being covered on the tank having a control panel allowing a user to preset intermittent cycle for oil supplying to external working machines via a pipe, a motor transmittedly engaged to a pump which is installed in the inner space of the tank having a plurality of oil passages allowed to transport the oil from the tank to external working machines. A pressure-adjusted valve is located in the cover exactly at one of the oil passage for adjusting the oil flow rate therethrough. A control circuit installed inside the control panel allows the user to preset the intermittent supplying cycle and indicates an insufficient oil situation if the tank is short of oil. At least one detecting device is installed at relatively far end of the pipe for detecting the oil pressure thereof and emitting alarm when the far end pipe has an insufficient oil pressure situation.

DETAILED DESCRIPTION OF THE PREFERRED EMBODIMENTS

Figure 1:
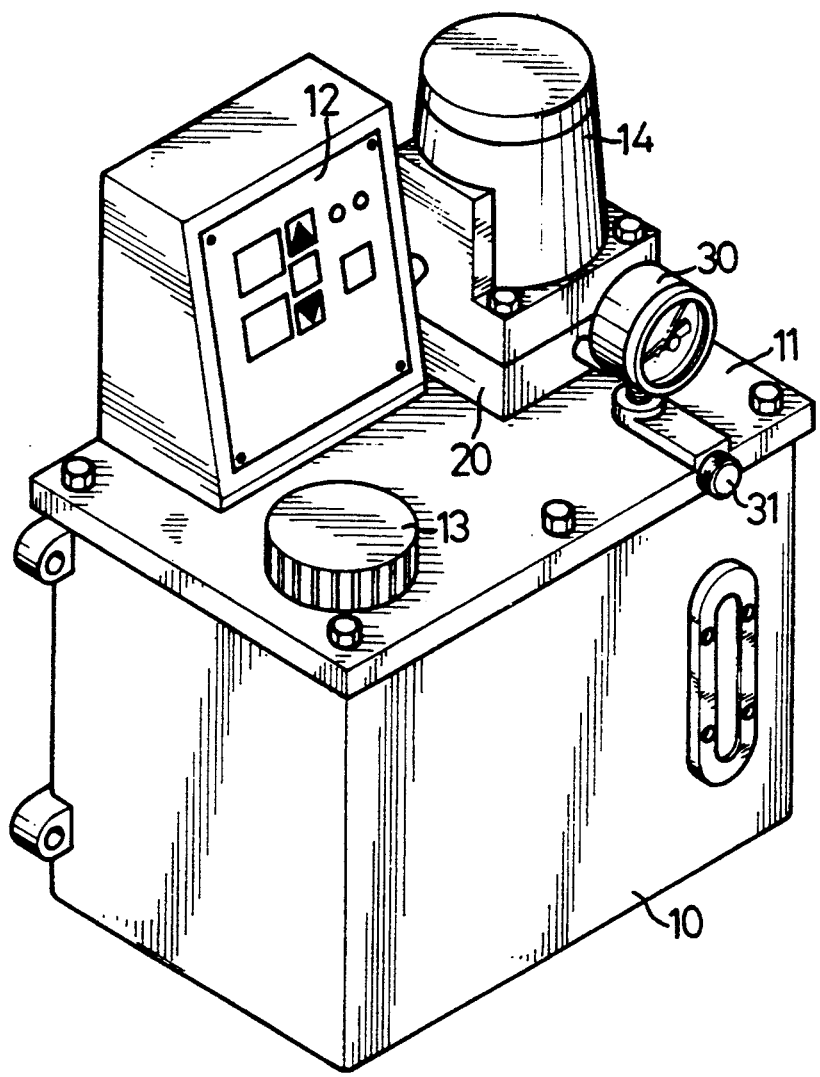
FIG. 1 is a perspective view of a control apparatus for a lubrication pump in accordance with the present invention.

Referring to FIG. 1, a control apparatus for a lubrication pump comprises a tank 10, to which a cover 11 is covered. Lubrication oil is contained inside the tank 10, which is allowed to be pumped out of the tank 10 to supply to a working machine. The cover 11 has a control panel 12, an oil inlet 13, and a motor 14 formed thereon. The motor 14 is connected to a pump 20 at the bottom thereof. The pump 20 has the majority part thereof installed inside the tank 10. A pressure-adjusted valve 31 and an oil pressure meter 30 are located on the cover 11 near the pump 20.

Figure 2:
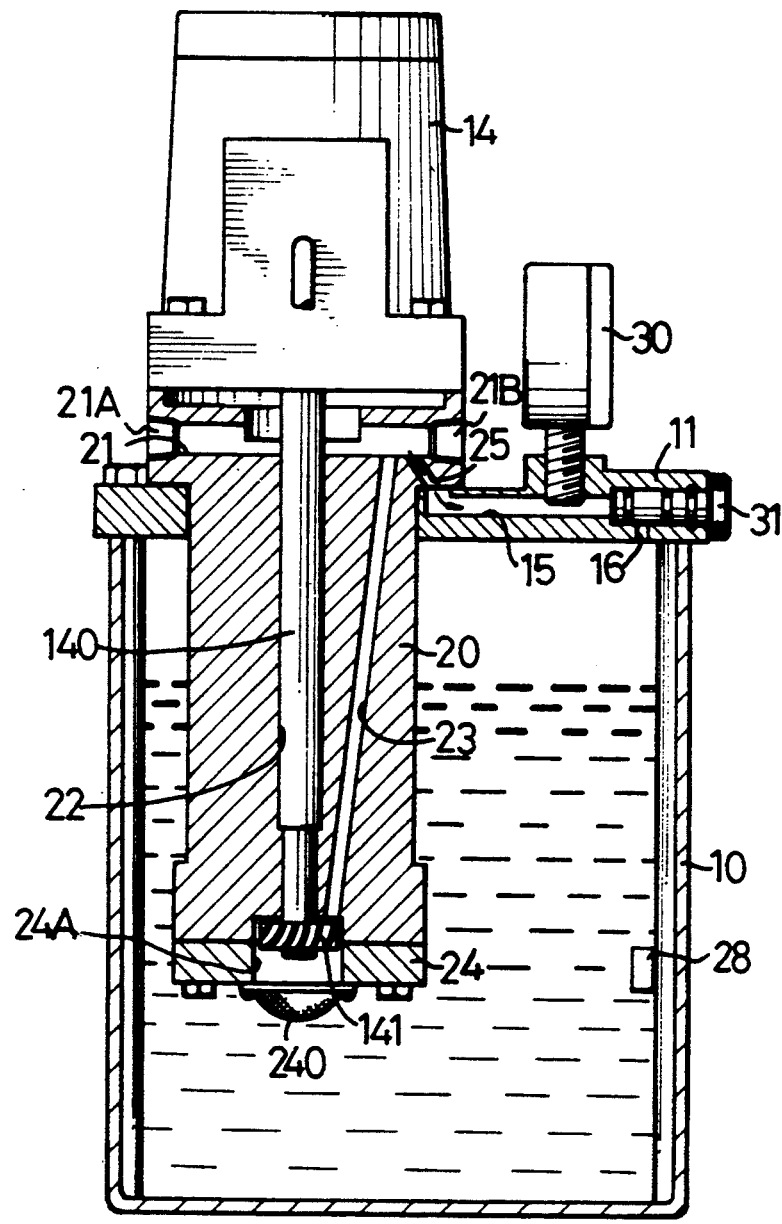
FIG. 2 is a sectional view of the control apparatus as shown in FIG. 1.

Referring to FIG. 2, the pump 20 has a first oil passage 21 horizontally formed at the top portion therein. The first oil passage 21 has two outlets 21A, 21B at two distal ends thereof each respectively connected to a pipe (not shown) which is connected to a plurality of external working machines (not shown) and supplying lubrication oil thereto. The pump 20 has a central hole 22 vertically formed in the central axis thereof allowing a shaft 140 of the motor 14 to be rotatably positioned therein and a second oil passage 23 formed nearby yet not in communication with the central hole 22. The central hole 22 has a lower end in communication with the inner space of the tank 10. The second oil passage 23 has an upper end in communication with the first oil passage 21 and a lower end in communication with the lower end of the central hole 22 for transporting the lubrication oil in the tank 10 through the first oil passage 21 and forwarding to the working machine. The shaft 140 has a lower end thereof connected to a impeller 141 for pumping the oil in the tank 10 up through the second oil passage 23, the first oil passage 21, the outlets 21A and 21B and to the working machines via the pipe. The pump 20 has a bottom cover 24 threadedly engaged to the bottom of the pump 20. The bottom cover 24 has a hole 24A exactly mating with the lower end of the central hole 22 and of course in communication therewith. A filter 240 is sealed on the hole 24A of the bottom cover 24 while allowing oil to pass therethrough. The filter 240 prevents the oil scale from entering the second oil passage 23 and merely allows clean oil passing therethrough. A third oil passage 25 is obliquely formed at the top of the pump 20 and in communication with the first oil passage 21 which further allows the oil inside the first oil passage 21 to be partially diverted therethrough. The cover 11 has a fourth oil passage 15 substantially horizontally formed therein while at the left end thereof is formed with a hole (not labeled) which is in communication with the third oil passage 25. A pressure adjusted valve 31 is rotatably engaged with the right end of the fourth oil passage 15 as will be described in more detail. A hole 16 is formed near the right end of the fourth oil passage 15 for communicating between the fourth oil passage 15 and the inner space of the tank 10. The third oil passage 25, the fourth oil passage 15 and the hole 16 together constitute a returning path allowing part of the oil in the first oil passage 21 to return to the tank 10. The oil pressure meter 30 is installed on the cover 11 and in communication with the third oil passage 15 yet not blocking the flowing of the oil therethrough. An oil shortage detector 28 is installed in the inner wall of the tank 10 substantially at the same vertical level of the filter 240. The oil shortage detector 28 will generate a warning signal when the oil level is lower than the detector 28.

Figure 3:
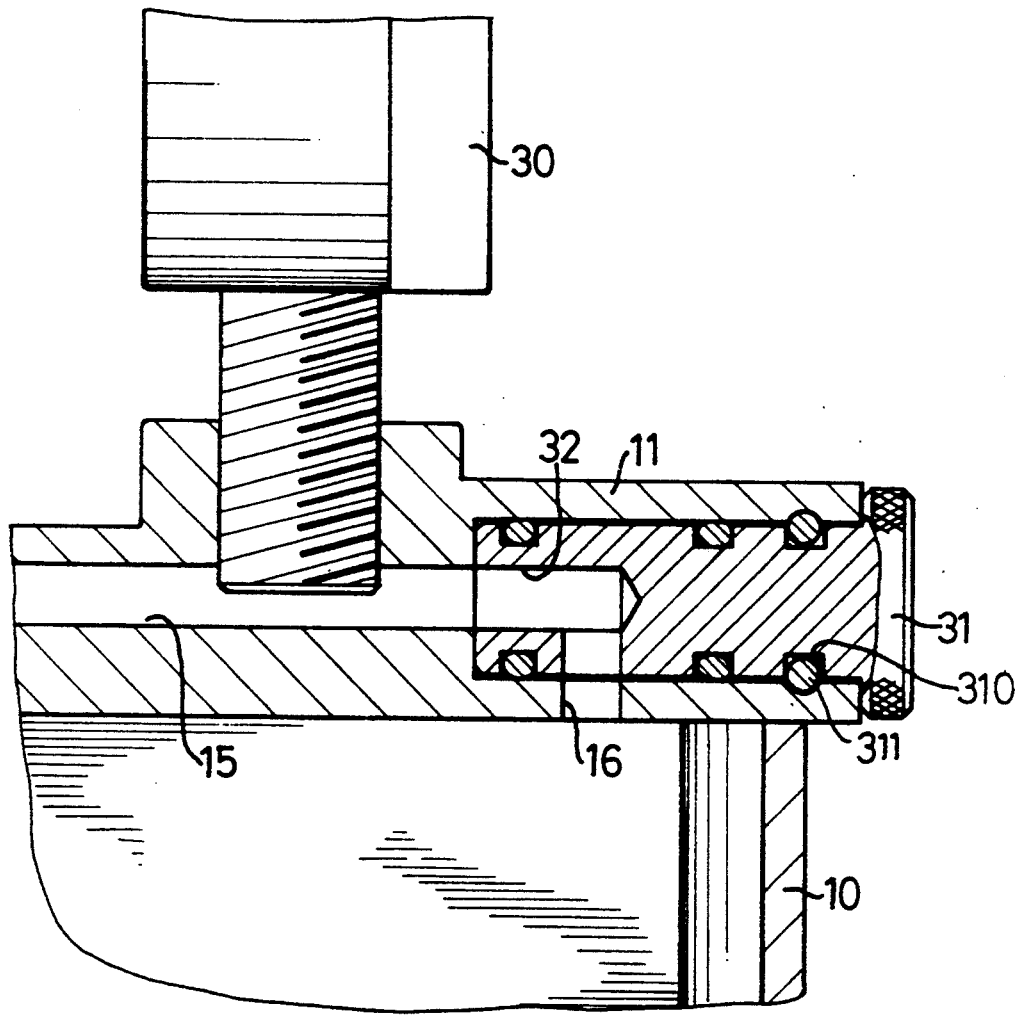
FIG. 3 is a partially enlarged view of FIG. 2.

Referring to FIG. 3, The pressure-adjusted valve 31 has a plurality of grooves 310 formed thereon and a plurality of corresponding oil seals 311 respectively engaged therein. An L-shaped hole 32 is formed inside the valve 31 having one end in communication with the fourth oil passage 15 and another end mating with the hole 16. The returning oil is actually diverted from the first oil passage 21 via the third oil passage 25, the fourth oil passage 15, the L-shaped hole 32, and the hole 16 and back to the tank 10. Since the valve 31 is rotatable inside the fourth oil passage 15, therefore the amount of the oil returning back to the tank 10 can be adjusted by rotating the valve 31. As well known, when the valve 31 is rotated, the mating portion between the slot 32 and the hole 16 is changed thus changing the oil flow rate through the hole 16, and in the mean time changing the oil pressure value read from the oil pressure meter 30. Since the returning oil is diverted from the first oil passage 21, the oil flow outputted from the outlets 21A and 21B can be sampled from the oil pressure meter 30 by some precalculation, which is well known and not described in detail. It is noted that the oil supplying to the working machine is fulfilled intermittently, i.e., each supplying has an amount according to the adjusting of the valve 31 and the intermittent interval between each supplying is determined by a control circuit as will be described later.

Figure 4:
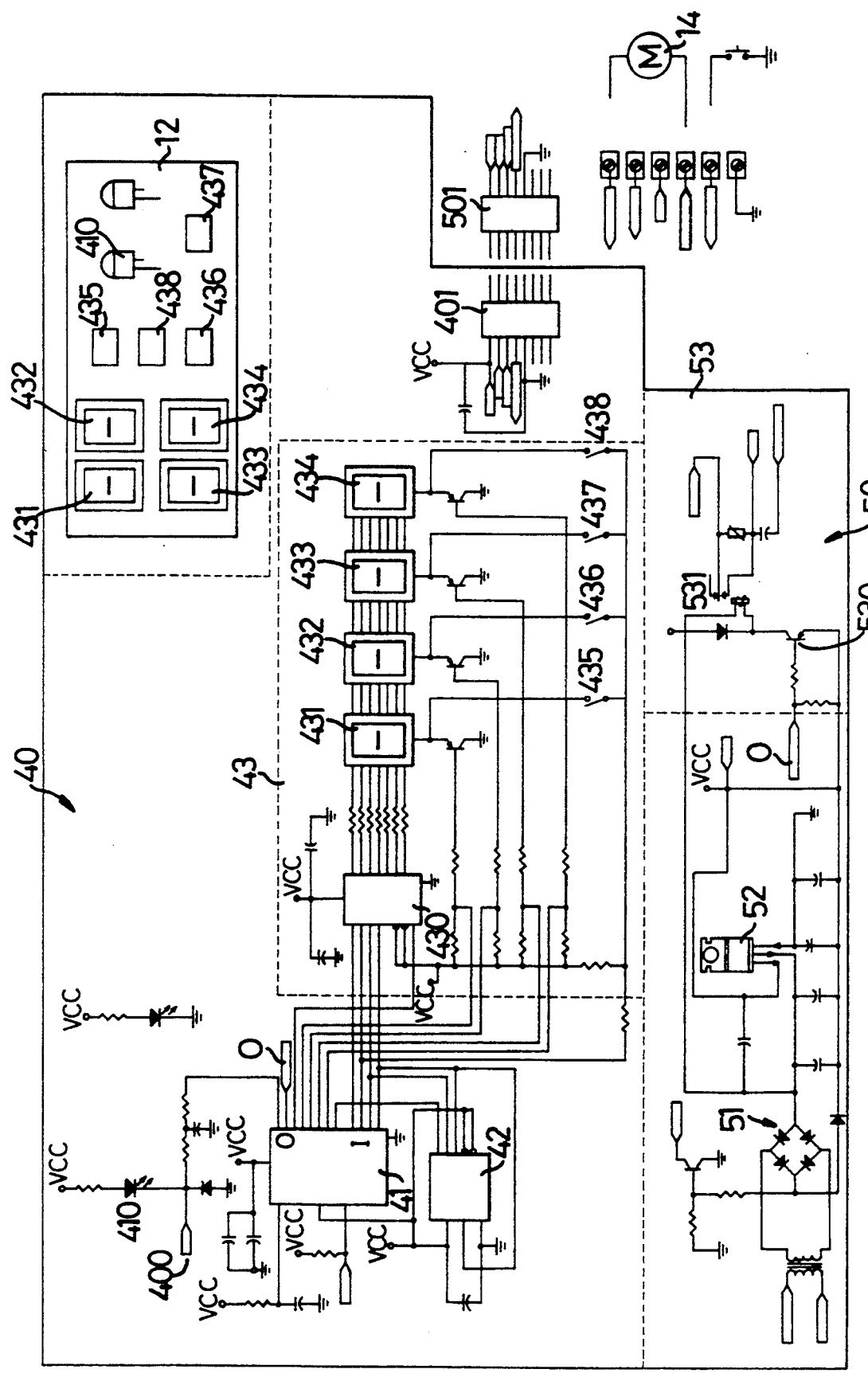
FIG. 4 is a control circuit in accordance with the present invention.
Figure 5:
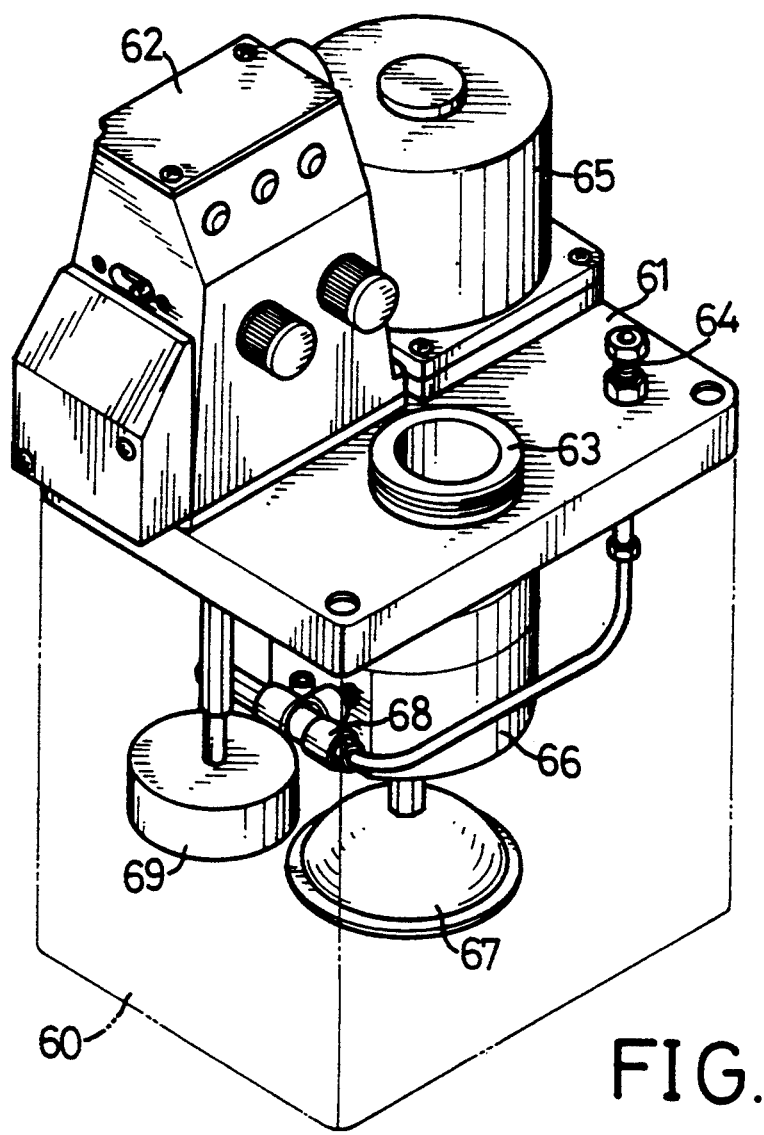
FIG. 5 is a conventional oil supplying machine.

The above oil supplying machine is controlled by the control circuit which is installed inside the control panel 12 of FIG. 1. Referring to FIG. 4, the control circuit in accordance with the present invention comprises a control/setting unit 40 and a power driving unit 50 and both of which are electrically connected with each other by two connectors 401 and 501 as shown in the right side of the figure. The control/setting unit 40 comprises a microprocessor 41, a memory 42, and a displaying/setting circuit 43. The microprocessor 41 has one input terminal thereof connected to an oil shortage detecting terminal 400 for detecting whether the oil in the tank 10 is less than a minimum level and an output terminal 0 connected to the power driving unit 50 for triggering the latter to actuate the motor 14. The oil shortage detecting terminal 400 is electrically connected to the oil shortage detector 28 for receiving the warning signal therefrom. A first light emitting diode (LED) 410 is also connected to the oil shortage detector 28 for indicating whether the tank 10 is short of oil. The displaying/setting circuit 43 comprises a display driving circuit 430 connected to four seven-segment displays 431, 432, 433, and 434 each of which represents a digit. Four switches 435, 436, 437, and 438 each having one end respectively connected to the four displays 431, 432, 433, and 434 and another end are connected together and further connected to the display driving circuit 430 and an input terminal I of the microprocessor 41. The switch 435 is used to increase the intermittent interval of each oil supplying. The switch 436 is used to decrease the intermittent interval of each oil supplying. However, in some case the user might want to supply oil to the working machine immediately and continuously. The switch 437 is provided to force the oil supplying when it is ON and cancel the forcedly supplying when it is OFF. The switch 438 is provided to select the time unit as hour or minute. The switches 435, 436, and 438 together are used to set the intermittent interval for the oil supplying to the working machines. The determined intermittent interval is stored in the memory 42 via the microprocessor 41 and is displayed on the displays 431 to 434 via the display driving circuit 430. The displays 431 to 434 and the switches 435 to 438 are installed on the control panel 12 for the user to operate thereon.

The power driving unit 50 comprises a bridge rectifier 51 and a regulator 52. A driving circuit 53 connected to the regulator 52 comprises a transistor 530 and a relay 531. The transistor 530 has a base connected to the output terminal 0 of the microprocessor 41 and controlled by the latter. The relay 531 has an operational contact thereof connected to the motor 14 thus actuating the latter to rotate.

When the control circuit is powered on, the oil shortage detecting terminal 400 transmits the oil situation to the microprocessor 41. Therefore, when the detector 28 does not generate the warning signal to the microprocessor 41 via the terminal 400, the microprocessor 41 will respond to the intermittent interval set by the user and actuate the motor 14 to rotate intermittently, thus providing the working machine oil intermittently. More specifically, the microprocessor 14 responds to the "no shortage of oil" message from the terminal 400 and actuates the transistor 530 and the relay 531 to drive the motor 14 to rotate intermittently. However, if the detector 28 generates the warning signal to the oil shortage terminal 400, the microprocessor 41 will respond to stop the motor 14. In the mean time the LED 410 will be actuated ON and indicate the user to add more oil to the tank 10.

Figure 7:
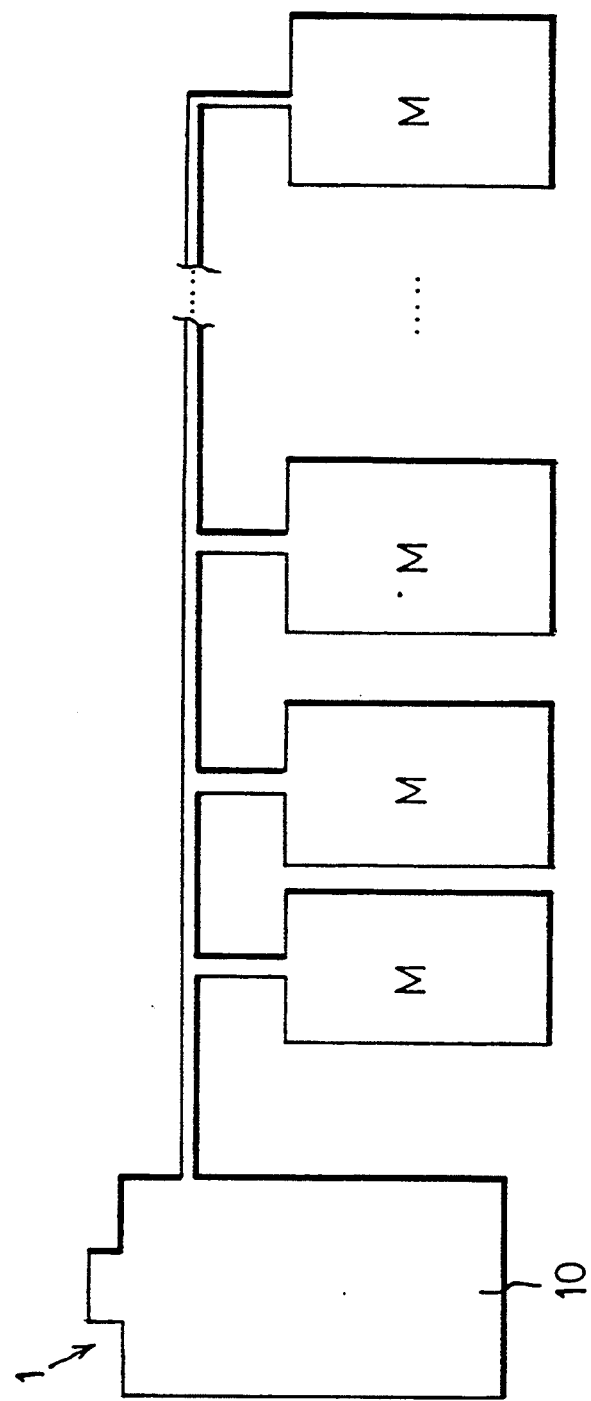
FIG. 7 is a schematic view illustrating an oil supplying machine supplies oil to a plurality of working machines, where part of the working machines are omitted.

Referring to FIG. 7, one oil supplying machine 1 may have to supply oil to a plurality of working machines M. There is no insufficient pressure problem for the working machines near the supplying machine 1. However, for those working machines located in relatively far end will suffer for the insufficient oil pressure. Therefore, the inventor of the present invention further invents an oil pressure detecting means 3 allowed to be installed on the relatively far end pipe for sensing the oil pressure therein thus indicating the insufficient oil pressure problem of the far end working machine when the oil supplying machine 1 is in operation. The oil pressure detecting means 3 is allowed to cooperate with the oil pressure meter 30 thus monitoring the oil pressure in both near end and far end and assuring the oil pressure to be maintained in a requisite level for all working machines.

Figure 6:
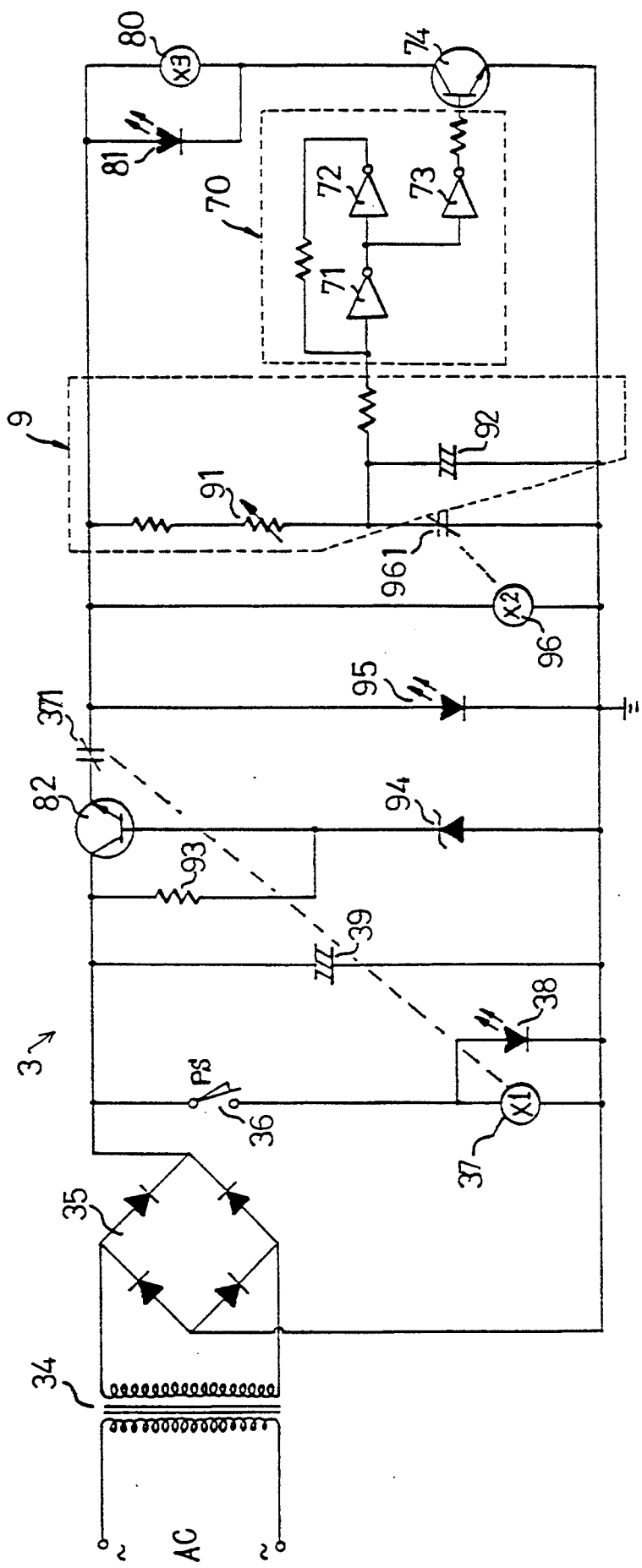
FIG. 6 is a detecting circuit in accordance with the present invention.

Referring to FIG. 6, the oil detecting means 3 comprises a transformer 34 connected to an AC source for decreasing the AC voltage thereof. A bridge rectifier 35 is connected to the transformer 34 for rectifying the decreased AC voltage to DC voltage. A capacitor 39 is connected to the bridge rectifier 35 for filtering as is well known. A regulator comprising a transistor 82, a resistor 93, and a zener diode 94 is connected to the capacitor 39 for converting the filtered voltage to a regulated DC voltage. An oil pressure switch 36 is connected to a shunted connection of an actuating coil 37 of a first relay and a second LED 38, which together are connected in parallel with the capacitor 39. Actually the first relay comprises the actuating coil 37 and a switch 371. The switch 371 is OFF when the actuating coil 37 is energized, and ON when the actuating coil 37 is not energized. Actually the switch 371 is a normally closed contact of the first relay. The oil pressure switch 36 is installed in an appropriate position of a pipe especially for one which is in a relatively far end from the oil supplying machine 1. The oil pressure switch 36 is ON when the oil pressure in the pipe is in normal condition, while OFF when the oil pressure in the pipe is less than the predetermined value. Normally, the oil pressure is sufficient, and the oil pressure switch 36 is ON, which in turn energizes the actuating coil 37, cutting off the switch 371 and turns on the second LED 38. The second LED 38 is a green one which is ON for illustrating the oil pressure of the far end pipe is in normal condition. When the switch 371 is cut off, the sequent circuit portion connected thereafter is also OFF. When the oil pressure is insufficient, the oil pressure switch 36 is OFF, which in turn de-energizes the actuating coil 37, turning on the switch 371, and turns off the second LED 38. When the switch 371 is turned on, the sequent circuit portion connected thereafter is also ON.

A third LED is connected to the switch 371 for illustrating a time counting is started when it is ON. The third LED 95 emits yellow light when ON. A second relay comprising a second actuating coil 96 and a second switch 961 are connected in parallel with the third LED 95. A delaying circuit 9 comprising a variable resistor 91 and an integration capacitor 92 are connected to the second switch 961 of the second relay for delaying a time period by charging to the integration capacitor 92. The variable resistor 91 is used to adjust the delaying time of the delaying circuit 9. An oscillator 70 comprising a plurality of inverters 6, 62, and 63 is connected to an output terminal of the delaying circuit 9 for generating an oscillating signal from the inverter 63. A second transistor 74 has the base thereof connected to the inverter 63 via a resistor (not labeled) and the emitter connected to ground. A shunted pair of a fourth LED 81 and a third actuating coil 80 of a third relay is connected to the collector of the second transistor 74. The corresponding switch (not shown) of the third relay is connected to a well known alarm speaker and the microprocessor 41 of the control circuit as shown in FIG. 4. When the oil pressure switch 36 senses insufficient pressure situation on the far end pipe, the switch 371 is ON, the third LED is ON illustrating the time counting is started, the second actuating coil 96 is energized causing the second switch 961 to be OFF, which in turn allows the integration capacitor 92 to charge via the variable resistor 91, thereby starting the time delaying. After a predetermined time period, the capacitor 92 is full-charged causing a logical "high" voltage to trigger the oscillator 70 to generate an oscillating signal which further actuates the transistor 74 to be intermittently ON and OFF, thus causing the LED 81 to flash and also causing the alarm speaker to buzz and also causing the microprocessor 41 to enable a light (not shown) or the like on the cover 11 to inform (warn) the user near the oil supplying machine. The fourth LED 81 emits red light when it is ON for achieving warning effect.

When the insufficient oil pressure problem is solved, the oil pressure switch 36 is ON again, the second LED emits green light illustrating the oil pressure is sufficient, the switch 371 is OFF thus cutting off the electricity to the sequent circuit portion and turning off the third LED 95 and the fourth LED 81.

Although the invention has been explained in relation to its preferred embodiment, it is to be understood that many other possible modifications and variations can be made without departing the spirit and scope of the invention as hereinafter claimed.

I claim:

1. A control apparatus for a lubrication pump to supply lubrication oil to a plurality of working machines comprising a tank (10) for storing lubrication oil;

a cover (11) being covered on said tank (10) having a control panel (12), an oil inlet (13), and a motor (14) formed thereon;

a pump (20) in said tank (10) being connected to said motor (14);

a first oil passage (21) being horizontally formed at an upper portion of said pump (20) having two outlets (21A, 21B) at two distal ends thereof each of which is connected to an external pipe which further provides oil to a plurality of working machines connected thereto;

a second oil passage (23) being formed in said pump (20) and in communication between said first oil passage (21) and a lower inner space of said tank (10);

a third oil passage (25) being obliquely formed at the upper portion of said pump (20) and in communication with said first oil passage (21) at an top end thereof;

a fourth oil passage (15) horizontally formed in said cover (11) having a left end thereof in communication with said third oil passage (25) and a right end;

a pressure-adjusted valve 31 being rotatably engaged inside said fourth oil passage (15) from the left end thereof having an L-shaped hole (32) therein for in communication with said fourth oil passage (15);

a hole (16) being formed at an lower surface of said cover (11) and in communication with said L-shaped hole (32);

a control circuit comprising a control/setting unit (40) which is electrically connected to a power driving unit (50) which is connected to said motor (14) for driving the latter, said control/setting unit (40) comprising a microprocessor (41) and a displaying/setting means (43) for setting an intermittent time interval to intermittently actuate said power driving unit (50), which in turn actuates said motor (14) to rotate intermittently, thus providing oil to said working machines intermittently.

2. The control apparatus as claimed in claim 1 further comprising at least one detecting means (3) installed at a relatively far end of said pipe for detecting the oil pressure thereof and emitting alarm when said far end pipe has an insufficient oil pressure situation.

3. The control apparatus as claimed in claim 1 further comprising a filter (240) which is sealed at the bottom of said pump (20) for preventing oil scale from entering said second oil passage (23) and allowing clean oil passing therethrough.

* * * * *